(12) United States Patent
Carlson et al.

(10) Patent No.: US 8,708,425 B2
(45) Date of Patent: Apr. 29, 2014

(54) BIMETALLIC CASTING

(75) Inventors: Blair E. Carlson, Ann Arbor, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 12/902,370

(22) Filed: Oct. 12, 2010

(65) Prior Publication Data

US 2012/0086264 A1    Apr. 12, 2012

(51) Int. Cl.
*B60B 1/06* (2006.01)
*B60B 3/06* (2006.01)

(52) U.S. Cl.
USPC ......................................... 301/55; 301/63.106

(58) Field of Classification Search
USPC ...................... 301/5.308, 63.101, 63.106, 65; 29/894.011, 894.32; 295/29–30
See application file for complete search history.

(56) References Cited

U.S. PATENT DOCUMENTS

| | | | | |
|---|---|---|---|---|
| 3,506,311 | A * | 4/1970 | Nobach | 301/63.105 |
| 5,259,437 | A | 11/1993 | Jarry | |
| 5,293,923 | A | 3/1994 | Alabi | |
| 5,421,642 | A * | 6/1995 | Archibald | 301/65 |
| 5,526,977 | A * | 6/1996 | Wei | 228/208 |
| 6,045,196 | A * | 4/2000 | Mason | 301/63.104 |
| 6,325,462 | B1 * | 12/2001 | Hummel et al. | 301/65 |
| 6,364,425 | B1 * | 4/2002 | Marquis | 301/65 |
| 2004/0187965 | A1 | 9/2004 | Nakao et al. | |
| 2010/0117443 | A1 * | 5/2010 | Luo et al. | 301/63.102 |
| 2011/0089749 | A1 * | 4/2011 | Kleber et al. | 301/64.307 |
| 2011/0227400 | A1 * | 9/2011 | Stich et al. | 301/63.101 |
| 2011/0241414 | A1 * | 10/2011 | Ono et al. | 301/63.103 |

FOREIGN PATENT DOCUMENTS

| | | | |
|---|---|---|---|
| DE | 3009080 | A1 | 8/1981 |
| DE | 102007055328 | A1 | 5/2009 |
| DE | 102007059771 | A1 | 6/2009 |
| DE | 102008049488 | A1 | 4/2010 |
| DE | 102010018004 | A1 | 12/2010 |
| FR | 2786418 | A1 | 6/2000 |
| JP | 2001246456 | A | 9/2001 |
| WO | 03066255 | A1 | 8/2003 |
| WO | WO2010067626 | A1 * | 6/2013 ............ 301/63.101 |

OTHER PUBLICATIONS

V.S. Smorshcho, "Production of Seamless Bimetallic Tubes", Translated from Metallurg, No. 5, pp. 29-31, May 1964.

* cited by examiner

*Primary Examiner* — Jason Bellinger
(74) *Attorney, Agent, or Firm* — Quinn Law Group, PLLC

(57) ABSTRACT

A method of forming a casting includes providing a preform to a mold cavity. The preform is formed from one of a first metal and a second metal and defines an interface surface. A molten portion of the other of the first metal and the second metal is cast into the mold such that the molten portion proximately contacts the interface surface of the preform. An interface layer at the interface surface, a first portion defined by the mold cavity and the interface layer, and a second portion defined by the interface layer, are formed during casting. The interface layer may define a metallurgical bond between the first portion and the second portion. In the non-limiting example provided herein, the first portion is substantially comprised of aluminum and the second portion is substantially comprised of magnesium. In a non-limiting example, the casting may be configured as a vehicle wheel.

18 Claims, 3 Drawing Sheets

BIMETALLIC CASTING

TECHNICAL FIELD

The present invention relates to forming a bimetallic casting.

BACKGROUND

Components formed of magnesium offer advantages such as high strength to weight ratio when compared to similarly sized components formed of aluminum or ferrous based materials. For example, wheels have been forged from magnesium for specialized applications such as racing vehicle wheels. The use of magnesium wheels for non-specialty vehicles has been limited by the poor corrosion performance of magnesium. Coatings applied to the surface of magnesium components, for example, diffused aluminum powder coatings, to improve the corrosion performance of the magnesium have been developed, however spalling and chipping of applied coatings negates the protective effect of the coating. The material, processing time, equipment, handling and transportation, and associated costs required to apply coatings such as diffused aluminum powder coatings to magnesium components in a secondary process are disadvantageous to the use of applied coatings for corrosion improvement of magnesium components.

SUMMARY

A method of forming a casting is provided. The casting is comprised of an interface layer, a first portion defined by a mold cavity and the interface layer, and a second portion defined by the interface layer. The casting may be configured, in a non-limiting example, as a wheel adaptable for use on a vehicle. The method includes providing a preform to a mold cavity, wherein the mold cavity is defined by a casting mold. The preform is formed from one of a first metal and a second metal and is configured to define an interface surface. A molten portion of the other of the first metal and the second metal is provided to the mold cavity, and is cast into the mold such that the molten portion proximately contacts the interface surface of the preform. The method includes forming a casting which includes an interface layer at the interface surface, a first portion defined by the mold cavity and the interface layer; and a second portion defined by the interface layer. The interface layer may include a metallurgical bond formed between the first portion and the second portion. In the non-limiting example provided herein, the first portion is substantially comprised of aluminum or an aluminum alloy, and the second portion is substantially comprised of magnesium or a magnesium alloy.

The method may provide a casting which is adaptable for use as a wheel for a vehicle and configured such that the aluminum-based first portion substantially encapsulates the magnesium-based second portion to provide a vehicle wheel with a higher strength to weight ratio in comparison to aluminum alloy wheels, and improved corrosion performance in comparison to magnesium alloy wheels.

The above features and other features and advantages of the present invention are readily apparent from the following detailed description of the best modes for carrying out the invention when taken in connection with the accompanying drawings.

DETAILED DESCRIPTION

Figure 1:
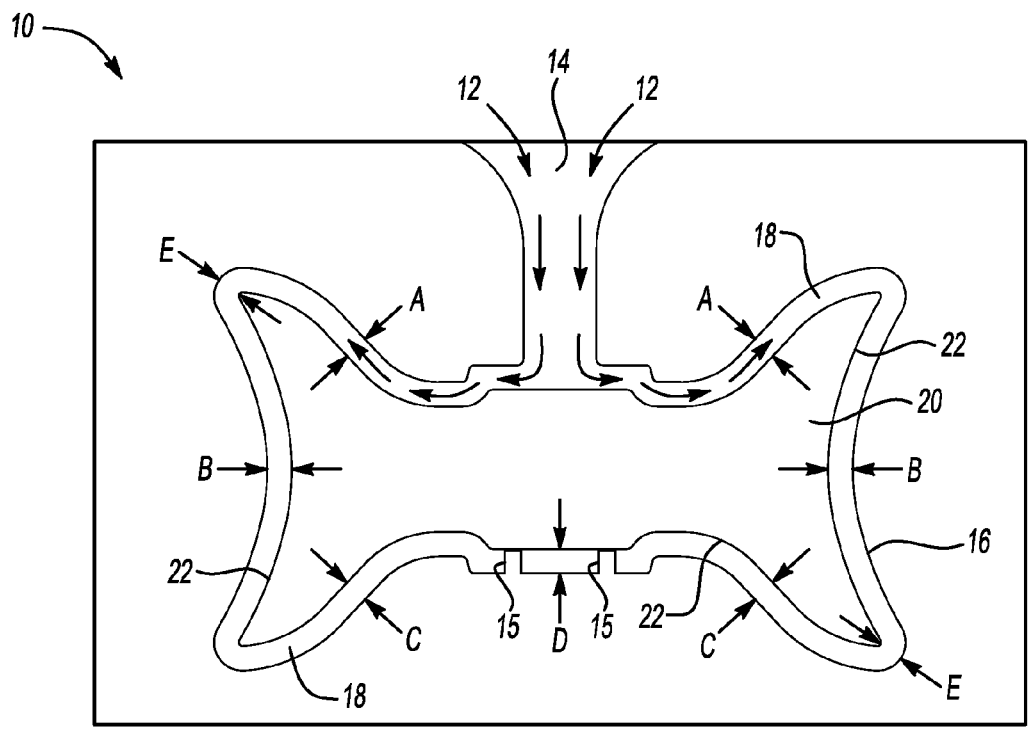
FIG. 1 is a schematic illustration of a cross-sectional view of a mold and a preform defining a second portion of a casting produced by the mold.

Referring to the drawings wherein like reference numbers represent like components throughout the several figures. The elements shown in FIGS. 1-6 are not to scale or proportion. Accordingly, the particular dimensions and applications provided in the drawings presented herein are not to be considered limiting.

FIG. 1 shows a cross-sectional view of a casting mold 10, which defines a mold cavity 16 and a sprue or gate 14, through which molten metal 12 may be provided to the mold cavity 16 during the casting process. The mold 10 may be a permanent mold, a sand mold or other mold suitable for casting a cast component as described herein. The mold 10 may further include additional gates, runners and core pieces configured and positioned as may be required to provide molten metal to the mold cavity 16 in sufficient quantity and at a suitable flow, distribution and temperature to produce a casting as described herein.

Figure 2:
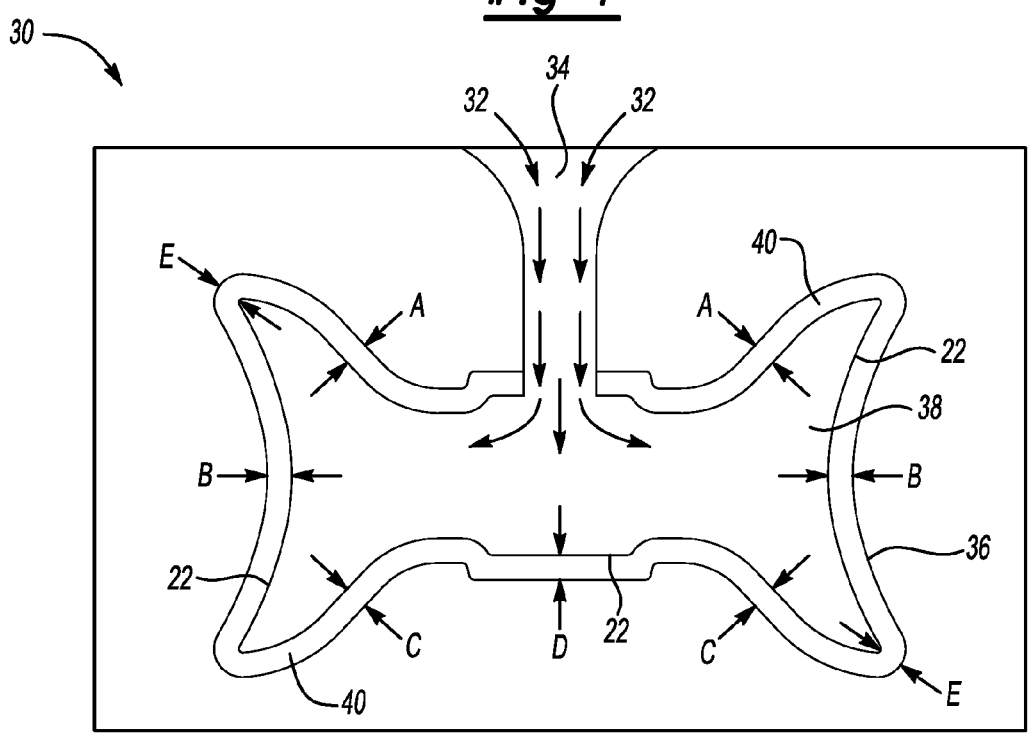
FIG. 2 is a schematic illustration of a cross-sectional view of a mold and a preform defining a first portion of a casting produced by the mold.

A method of forming a casting is provided, and is shown in FIGS. 1 and 2. In FIG. 1, the method includes providing a preform or insert 20 to the mold cavity 16. In the non-limiting example shown, the mold cavity 16 is generally configured to define a wheel or wheel blank which is adaptable for use on a vehicle (see FIGS. 3-4 and 5-6). The preform 20 is formed from a first metal, which in the example shown in FIG. 1 may be magnesium, a magnesium alloy, or a material of predominantly magnesium composition.

Figure 4:
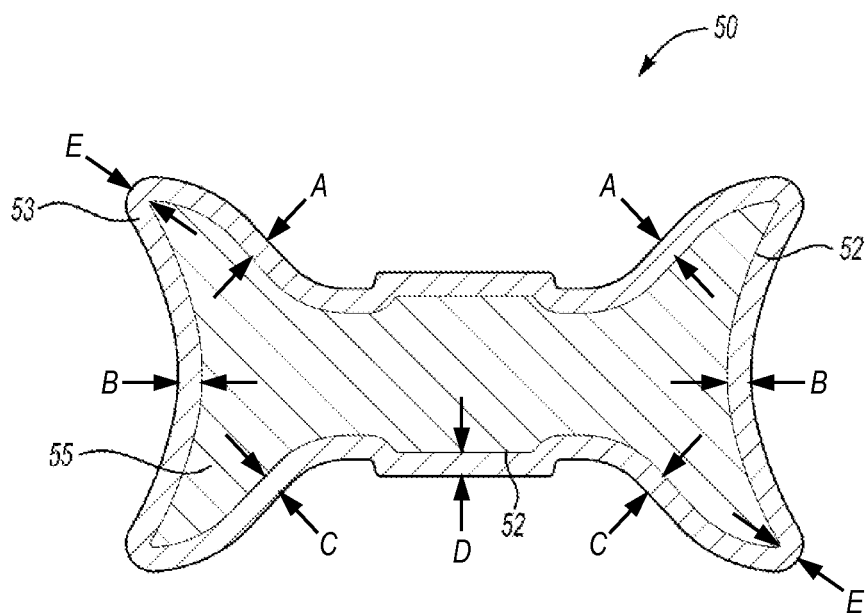
FIG. 4 is a schematic cross-sectional view of the casting of FIG. 3.

The preform 20 is configured to define an interface surface 22, and may be formed as one of a casting, a forging, an extrusion, a stamping and a spun component. The preform 20 is positioned in the mold cavity 16 such that a passage 18 is defined between the interface surface 22 and the inner surface of the mold cavity 16. The passage 18 defines the cast portion of the component produced by casting metal 12 into the mold cavity 16 of FIG. 1, where the cast portion is shown in FIG. 4 as a first portion 53 of a cast component 50 generally configured as a wheel or wheel blank and produced using the casting method of FIG. 1. The preform 20 may be positioned in the mold cavity 16, for example, by core pins 15 or similar locating elements, to locate the preform 20 in the cavity 16 and to allow for the molten metal 12 to flow around the preform 20 during casting. The core pins 15 may be located in the mold cavity and in proximate contact with areas of the preform 20 which are non-critical or less critical to the corrosion performance of the finished casting. The non-critical or less critical areas may be areas of the casting which have limited exposure to corrosive elements during use, or which may be provided protection from corrosive elements by another component of the wheel assembly. For example, the preform 20 may be positioned in mold cavity 16 using core pins 15 in proximate contact with a hub surface, generally defined by section D in FIG. 1, where the hub surface of the cast wheel may be protected by a wheel cover or other trim piece when the wheel is in its as-installed configuration on a vehicle. It would be understood that mold cavity 16 may be provided with additional core pins or locating elements in other areas or in configurations other than those shown in FIG. 1.

The passage 18 is characterized by a gap between the interface surface 22 and the adjacent surface of the mold cavity 16, where the width of the gap is indicated at various sections thereof in FIG. 1 by the letters A, B, C, D and E. It is understood that the width of the gap between the interface surface 22 of preform 20 and the wall of the mold cavity 16 will generally define the thickness of the cast portion formed by metal 12 in FIG. 1 and generally the thickness of the first portion 53 of the cast component 50 shown in FIGS. 3 and 4. The configuration of passage 18 and the width of the gap defined by passage 18 is determined by the configuration of the interface surface 22 of preform 20 and the position of preform 20 in mold cavity 16, wherein a change in either or both of these will change the configuration of passage 18 and the resultant thickness of the cast portion formed by molten metal 12.

A molten portion of another, or second, metal 12 is provided to the mold cavity 16 through the sprue 14, and is cast into the mold cavity 16 such that the molten portion of the metal 12 flows into and through the passage 18 and proximately contacts the interface surface 22 of the preform 20. In the non-limiting example shown in FIG. 1 the second metal 12 may be one of aluminum, an aluminum alloy or a material of predominantly aluminum composition. The molten portion 12 solidifies to define the first portion 53 generally surrounding a second portion 55 of a cast component 50 (see FIGS. 3 and 4), where the second portion 55 is generally defined by and comprises the preform 20. The preform 20 may be operatively configured as a heat sink, such that preform 20 absorbs and dissipates heat generated by the molten metal 12 as metal 12 solidifies to form the first portion 53 and the interface layer 52.

The method includes forming an interface layer (see 52 in FIG. 4, for example) at the interface surface 22 during the casting process. The interface layer 52 may form as the molten metal 12 contacts the interface surface 22 of the preform 20, which may cause some degree of melting of the preform 20 at the interface 22. In the example shown, the melting temperature of the molten metal 12, e.g., the aluminum or an aluminum alloy, is similar to the melting temperature of the magnesium or magnesium alloy comprising preform 20. The resultant interface layer 52 which is formed during the casting process may define a metallurgical bond between the first portion 53 and the second portion 55 of casting 50, and may further be defined by an intermetallic compound formed at the interface layer 52, where the intermetallic compound includes, for example, magnesium and aluminum.

The passage 18 may be defined by a gap of constant width, e.g., the distances A, B, C, D, E may be substantially equal, such that the cast portion formed by metal 12 is of substantially equal thickness in each section and across the surface of the casting 50. The gap may be of variable width, e.g., the distances or gap widths A, B, C, D, E may not all be equal, such that the thickness of the cast portion is variable across the surface of the casting 50 or from one section to another section. The gap width may be varied, for example, to provide a first portion 53 (see FIG. 3) of variable thickness on wheel casting 50. For example, thicker sections of aluminum may be provided on certain areas of the wheel 50 for increased corrosion protection, or to provide additional stock for subsequent machining or other finishing treatments. For example, it may be desirable to configure passage 18 such that the gap width C is greater than the gap widths B and D, wherein the cast sections defined by gap width C are on the wheel face, which, when the wheel is assembled on a vehicle, is exposed to a road environment including stone chipping, road dirt, water, salt and other factors from which corrosion protection is required. By comparison, gap widths B and D corresponds to sections of the wheel 50 which may be substantially covered by a vehicle tire and a hub cap or decorative trim cover, respectively, such that these sections may be minimally exposed to the road environment. Accordingly, it may be desirable to minimize the gap widths B and D such that the aluminum portion 53 in these areas provides nominal corrosion protection to the magnesium portion 55 of the wheel (referring to FIG. 3), and recognizing aluminum is denser than magnesium, to minimize the weight contribution of the aluminum portion of the wheel to maximize the strength to weight ratio of the wheel 50. By way of another non-limiting example, the gap width E may be greater than the gap width of one or more of the other sections, to provide an increased thickness of aluminum at the rim of the wheel, for additional corrosion protection against nicks and scratches and stone-impingement on the protruding edge, and/or to provide additional material for finish of the bead mounting surface by machining or other secondary processes.

The mold cavity 16 and the passage 18 may be configured, as shown in FIG. 1, such that molten metal 12 can be poured into mold 10 to substantially or fully surround the preform 20, such that metal 12 encapsulates the surface of the preform 20 during the casting process. The casting produced, shown in a non-limiting example as casting 50 in FIGS. 3 and 4, may be characterized by a first portion 53 which substantially encapsulates the second portion 55, such that the aluminum comprising the first portion 53 provides a continuous, substantially uninterrupted corrosion protection layer over the magnesium comprising the second portion 55, thus coating or sealing the magnesium to limiting the exposure of the second portion 55 to corrosive factors and environments, thereby improving the corrosion performance of the wheel 50.

Figure 3:
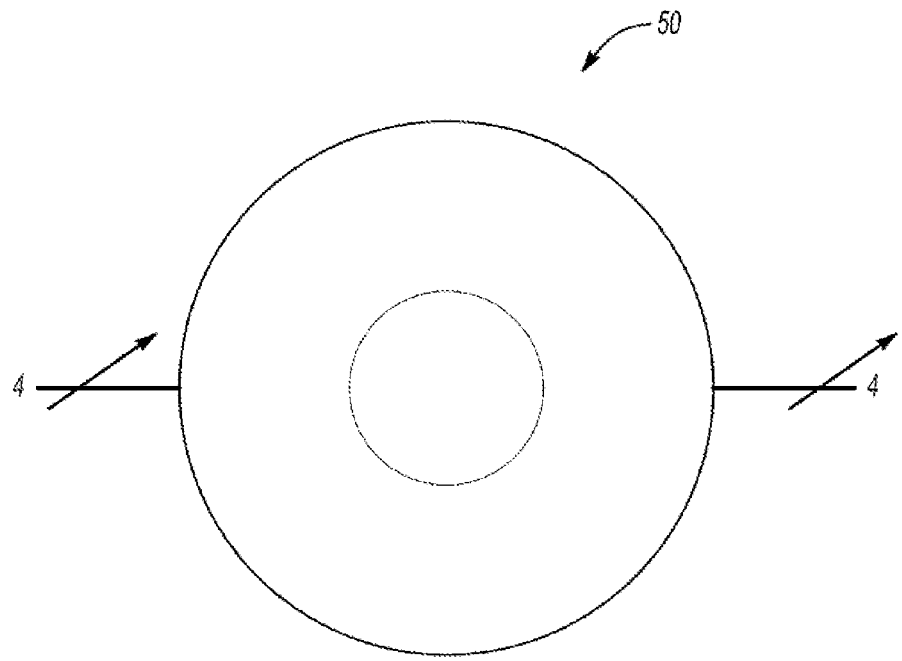
FIG. 3 is a plan perspective view of a casting formed using the method of FIG. 1 or FIG. 2.

FIG. 2 shows a cross-sectional view of an alternate arrangement for a casting process to produce, for example, the cast wheel 50 shown in FIGS. 3 and 4. FIG. 2 shows a casting mold 30, which defines a mold cavity 36, and a sprue or gate 34, through which molten metal 32 may be provided to the mold cavity 36 during the casting process. The mold 30 may be a permanent mold, a sand mold or other mold suitable for casting a cast component as described herein. The mold 30 may further include additional gates and runners as may be required to provide molten metal to the mold cavity 36 in sufficient quantity and at a suitable flow, distribution and temperature to produce a casting as described herein.

A method of forming a casting is provided, and includes providing a preform or insert 40 to the mold cavity 36. In the non-limiting example shown, the mold cavity 36 is generally configured to define a wheel or wheel blank which is adaptable for use on a vehicle (see FIGS. 3-4 and 5-6). The preform 40 is formed from a first metal, which in the example shown in FIG. 2 may be aluminum, an aluminum alloy, or material of predominantly aluminum composition.

The preform 40 is configured to define an interface surface 22, and may be positioned in mold cavity 36 such that the outermost surface of preform 40 generally conforms to the inner surface of mold cavity 36. The preform 40 may be configured to provide a passage 38, which is defined by the interface surface 22 of the preform 40. The passage 38 may be described as a preform cavity, a chamber, and/or a hollow space defined by the preform 40. The mold 30 and the preform 40 are configured such that molten metal 32 may be cast into the passage 38, such that the passage 38 and/or interface surface 22 defines the cast portion of the component produced by casting metal 32 into the mold cavity 36. The cast portion comprising metal 32 is shown in FIG. 4 as a second portion 55 of a cast component 50 generally configured as a wheel or wheel blank and produced using the casting method of FIG. 2.

The preform 40 is characterized by a width or thickness defined by the interface surface 22 and the outermost surface of preform 40, which may be configured to generally conform to the inner surface of mold cavity 36, where the width or thickness of the preform 40 is indicated at various sections thereof in FIG. 2 by the letters A, B, C, D and E. It is understood that the thickness of preform 40 between the interface surface 22 of preform 40 and the outermost surface of preform 40 will generally define the thickness of the first portion 53 of the component 50 shown in FIGS. 3 and 4. The configuration of passage 38 and the section thickness defined by preform 40 is determined by the configuration of the interface surface 22 of preform 40, and the configuration of the outermost surface of preform 40, which may conform generally to the inner surface of mold cavity 36.

A molten portion of another, or second, metal 32 is provided to the mold cavity 36 through the sprue 34, and is cast into the mold cavity 36 such that the molten portion of metal 32 flows into and through the passage 38 and proximately contacts the interface surface 22 of the preform 40. In the non-limiting example shown in FIG. 2 the second metal 32 may be one of magnesium, a magnesium alloy, or material of predominantly magnesium composition. The molten portion 32 solidifies to define a second portion 55 which is generally surrounded by a first second portion 53 of a cast component 50 (see FIGS. 3 and 4), where the first portion 53 is generally defined by and comprises the preform 40.

The method includes forming an interface layer (see 52 in FIG. 4, for example) at the interface surface 22 during the casting process. The interface layer 52 may form as the molten metal 12 contacts the interface surface 22 of the preform 20, which may cause some degree of melting of the preform 20 at the interface 22. In the example shown, the melting temperature of the molten metal 12, e.g., the aluminum or an aluminum alloy, is similar to the melting temperature of the magnesium or magnesium alloy comprising preform 20. The resultant interface layer 52 which is formed during the casting process may define a metallurgical bond between the first portion 53 and the second portion 55 of casting 50, and may further be defined by an intermetallic compound formed at the interface layer 52, where the intermetallic compound includes, for example, magnesium and aluminum.

The preform 40 may be defined by a constant thickness, e.g., the widths or thicknesses A, B, C, D, E may be substantially equal, such that the first portion 53 defined by preform 40 is of substantially equal thickness in each section across the surface of the cast component 50. The preform 40 may be of varying thickness from section to section, e.g., the thickness or widths A, B, C, D, E may not all be equal, such that the thickness of the preform 40 and the thickness of the first portion 53 defined by preform 40 is variable across the surface of the casting 50 or from section to section. The thickness may be varied, for example, to provide a first portion 53 (see FIG. 3) of variable thickness on wheel casting 50. For example, thicker sections of aluminum may be provided on certain areas of the wheel 50 for corrosion performance or to provide additional material for subsequent machining or finishing treatments. For example, the section thickness E may be greater than the gap width of one or more of the other sections, to provide an increased thickness of aluminum at the rim of the wheel, to provide surplus material to form or finish the bead or tire mounting surface, and/or for additional corrosion protection against nicks and scratches and stone-impingement on this protruding edge. By way of another non-limiting example, it may be desirable to configure preform 40 such that the section thickness C is greater than the section thicknesses B and D, wherein the sections of first portion 53 defined by thickness C are on the wheel face, which, when the wheel is assembled on a vehicle, is exposed to a road environment including stone chipping, road dirt, water, salt and other factors from which corrosion protection is required. By comparison, section thicknesses B and D correspond to sections of the wheel 50 which may be substantially covered by a vehicle tire and a hub cap or decorative trim cover, respectively, such that these sections may be minimally exposed to the road environment. Accordingly, it may be desirable to minimize the section thicknesses B and D such that the aluminum portion 53 in these areas provides nominal corrosion protection to the magnesium portion 55 of the wheel (referring to FIG. 3), and recognizing that aluminum is denser than magnesium, to minimize the weight contribution of the aluminum portion of the wheel to maximize the strength to weight ratio of the wheel 50. For example, section thickness B may be configured to be minimized such that during the casting process the molten metal 32 provides sufficient heat transfer to section B such that section B is at least partially melted and metal 32 significantly diffuses with the metal of preform 40 to form an intermetallic compound at the surface of casting 50 in the area of section B produced by the casting method shown in FIG. 2.

The mold cavity 36 and the preform 40 may be configured, as shown in FIG. 2, such that preform 40 may significantly encapsulate the cast second portion 55. By "significantly" encapsulating the second portion 55, the preform 40 may encapsulate all but an insignificant area of the surface of the second portion 55. The mold 30, mold cavity 36 and preform 40 may be configured such that the non-encapsulated area is generally located in a section of the wheel 50 which may be provided protection from corrosive elements by another component, for example, a hub or wheel cover or decorative trim piece, or which is located in an area of the wheel 50 which has limited exposure to road contaminants such as salt and water, stone impingement, or other environmental factors from which corrosion protection may be desired. The casting 50 may be characterized by a first portion 53 which significantly encapsulates the second portion 55, such that the aluminum comprising first portion 53 defines or provides a corrosion protection layer which substantially covers the magnesium comprising the second portion 55, thus limiting the exposure of the magnesium-based material comprising the second portion 55 to corrosive factors and environments, thereby improving the corrosion performance of the wheel 50.

The preform 40 may be formed as one of a casting, a forging, an extrusion, a stamping and a spun component or may be comprised of two or more preform elements, which may be operatively attached to one another. In a non-limiting example, the preform 40 may be formed by casting the preform 40 in the mold cavity 36 of mold 30. In this configuration, the metal comprising preform 40, which may be aluminum or an aluminum alloy, is provided in a molten state to the mold cavity 36 and as would be understood is cast to form the preform 40 including the preform passage 38.

FIG. 3 shows an example casting 50 which may be produced using a method as shown in FIG. 1 or FIG. 2. FIG. 4 shows a cross-sectional schematic view of the casting 50 taken through a section 4-4 shown in FIG. 3 and generally corresponding to the cross-sectional view of the casting mold shown in FIG. 1 and FIG. 2. In a non-limiting example, the casting 50 may be generally configured as a wheel or wheel blank adaptable for use in a vehicle. The wheel 50 includes a first portion 53 made of a first metal, a second portion 55 made of a second metal and an interface layer 52 defining a metallurgical bond between the first portion 53 and the second portion 55. The first portion 53 may be referred to as the shell or shell portion, and the second portion 55 may be referred to as the core or core portion. In a non-limiting example, the first portion 53 may be substantially comprised of aluminum, an aluminum alloy or a material of predominantly aluminum composition, and the second portion 55 may be substantially comprised of magnesium, a magnesium alloy or a material of predominantly magnesium composition to produce a wheel 50 which may be defined by a high strength to weight ratio. The interface layer 52 may further be defined by an intermetallic compound formed at the interface layer 52 during the casting process by which wheel 50 is formed, where the intermetallic compound includes, for example, magnesium and aluminum.

In a first configuration, the wheel 50 may be produced using the casting method shown in FIG. 1, wherein the first portion 53 is defined by a cast portion comprising metal 12, and is further defined by an interface layer 52 and the outermost or exterior surface of wheel 50 which generally conforms to the mold cavity 16. In the first configuration, the second portion 55 is defined by the preform portion 20 and the interface layer 52. In a second configuration, the wheel 50 may be produced using the casting method shown in FIG. 2, wherein the first portion 53 is defined by the preform portion 40 and the interface layer 52, and the second portion 55 is defined by a cast portion comprising metal 32 and defined by the interface layer 52, as described previously for FIG. 2.

Figure 5:
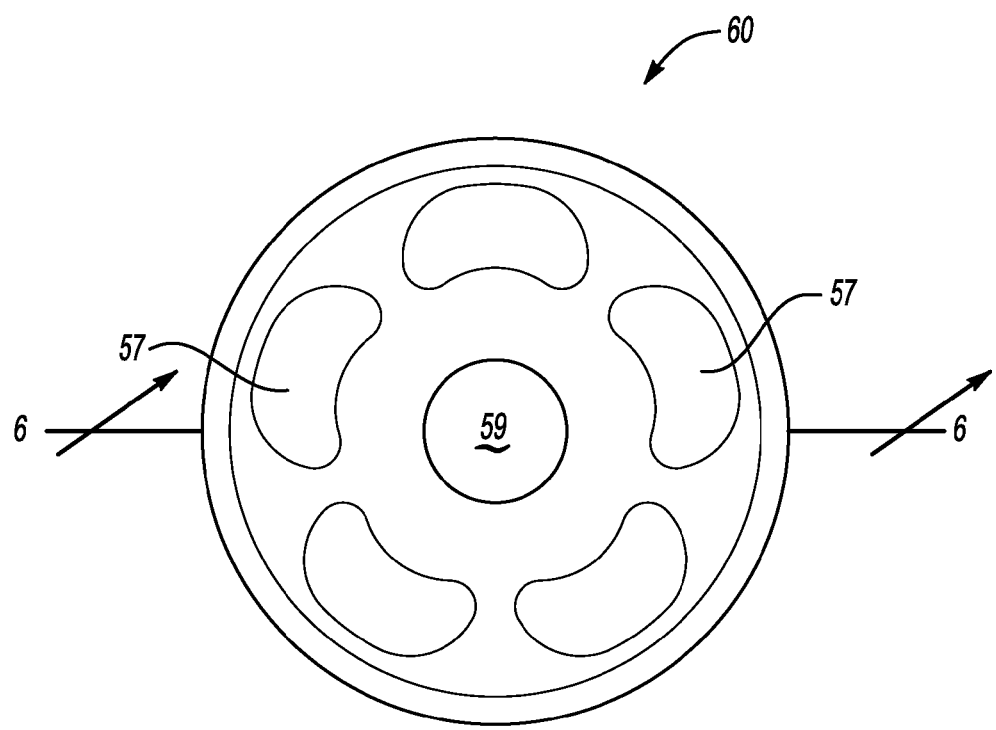
FIG. 5 is a plan perspective view of a wheel formed using the method of FIG. 1 or FIG. 2.
Figure 6:
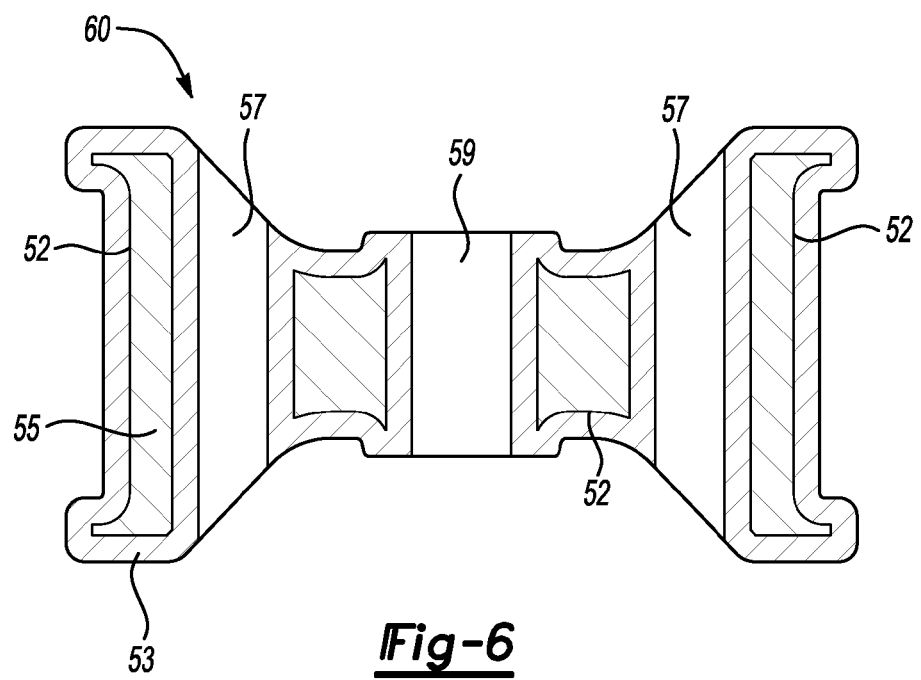
FIG. 6 is a schematic cross-sectional view of the wheel of FIG. 5.

It would be understood that multiple configurations of a casting or cast component produced as described herein may be possible. For example, FIG. 5 shows another example of a wheel 60 which may be formed using the method shown in FIG. 1 or FIG. 2. The wheel 60 includes a hub opening or hub bore 59, and further defines multiple openings 57 which may define, for example, spokes of the wheel 60. FIG. 6 shows a cross-sectional schematic view of the wheel 60 taken through a section 6-6 shown in FIG. 5, which illustrates a first portion 53 of the wheel 60 generally defining the outer surface or shell of the wheel 60, and a second portion 55 of the wheel 60 generally defining the core or body portion of the wheel 60. The first portion 53 is generally comprised of a first metal and the second portion 55 is generally comprised a second metal. An interface layer 52 defines a metallurgical bond between the first portion 53 and the second portion 55. In a non-limiting example, the first portion 53 may be substantially comprised of aluminum, an aluminum alloy or a material of predominantly aluminum composition, and the second portion 55 may be substantially comprised of magnesium, a magnesium alloy or a material of predominantly magnesium composition. The interface layer 52 may further be defined by an intermetallic compound formed at the interface layer 52 during the casting process by which wheel 60 is formed, where the intermetallic compound includes, for example, magnesium and aluminum.

In a first configuration, the wheel 60 may be produced using a casting method such as the method shown in FIG. 1, wherein the first portion 53 is defined by a cast portion comprising a metal 12. The cast portion comprising first portion 53 is defined during the forming method shown in FIG. 1 by a preform interface surface 22 and the mold cavity 16. It would be understood that the mold cavity 16 shown in FIG. 1, may be modified to produce the wheel 60 shown in FIGS. 5 and 6, for example, by modifying the configuration of the mold cavity 16 and/or by the addition of mold elements or features such as mold inserts to define openings 57 and bore 59. Further, in the first configuration, the preform which is provided and which defines second portion 55 of wheel 60 may be modified from the configuration shown in FIG. 1 to provide, for example, a modified interface surface 22 defining openings 57 and bore 59 of wheel 60.

In a second configuration, the wheel 60 may be produced using the casting method shown in FIG. 2, wherein the first portion 53 is defined by a preform and the interface layer 52, and the second portion 55 is defined by a cast portion comprising the metal 32 and further defined by the interface layer 52, as described previously for FIG. 2. It would be understood that the mold cavity 36 shown in FIG. 2 may be modified to produce the wheel 60 shown in FIGS. 5 and 6, for example, by modifying the configuration of the mold cavity 36 and/or by the addition of mold elements or features such as mold inserts to define openings 57 and bore 59. Further, in the second configuration produced using the method shown in FIG. 2, the preform which is provided and which defines first portion 53 of wheel 60 may be modified from the configuration shown in FIG. 2 to provide, for example, a modified passage configuration, which may include one or more passages, and a modified interface surface or interface surfaces to define openings 57 and bore 59 of wheel 60. The sprue and/or gating configuration of mold 30 may also be modified to provide the molten metal flow and distribution to the passage or passages defined by the preform, to cast the second portion 55, including, for example, the spokes of wheel 60 defined by openings 57.

The casting and the method of forming described herein are illustrated using an example of a vehicle wheel as the cast component. The example of a vehicle wheel shown in FIGS. 1-6 is intended to be non-limiting. The casting and the method of forming described herein may be configured to provide other components where a bimetal structure is advantageous, for example, to provide a high strength to weight ratio, or a surface structure differentiated from the core structure for corrosion protection or other functional, appearance, or performance characteristics and features. It would be understood that material combinations other than aluminum-based and magnesium-based materials are possible using the methods described herein.

It would be further understood that a cast component produced by a method as described herein may be modified by additional processing and/or secondary treatment to enhance, optimize and/or develop certain characteristics and/or features. Non-limiting examples of additional processing and/or secondary treatments which may be applied or used to meet dimensional, appearance, function and/or performance requirements and specifications include machining, burnishing, polishing, pressing, forging, heat treating, anodizing, localized surface treatment such as peening, laser treatment, friction mixing, etc., or a combination thereof.

While the best modes for carrying out the invention have been described in detail, those familiar with the art to which this invention relates will recognize various alternative designs and embodiments for practicing the invention within the scope of the appended claims.

The invention claimed is:
1. A wheel for a vehicle, the wheel comprising:
a first portion made of a first metal and configured as one of a core of the wheel and an outer shell of the wheel;
a second portion made of a second metal and configured as the other of the core and the outer shell;
the core defining a hub;
wherein the outer shell is configured to substantially encapsulate the core;

wherein one of the first portion and the second portion is defined by a cast portion; and a cast interface layer characterized by a cast grain structure and configured to metallurgically bond the core to the outer shell;

wherein the cast interface layer includes a cast intermetallic compound formed of the first metal of the first portion and the second metal of the second portion.

2. The wheel of claim 1, wherein the first metal is substantially comprised of one of aluminum and an aluminum alloy; and wherein the second metal is substantially comprised of one of magnesium and a magnesium alloy.

3. The wheel of claim 1, wherein the interface layer includes an intermetallic compound comprising the first metal and the second metal.

4. The wheel of claim 1, further comprising:

the interface layer defines a metallurgical bond between the hub and the outer shell.

5. The wheel of claim 1, wherein the outer shell includes a wheel face portion; and the interface layer is coextensive between the wheel face portion and the core.

6. The wheel of claim 1, further comprising:

the outer shell defining a rim portion having a first thickness and a hub portion having a second thickness; and wherein the first thickness is greater than the second thickness.

7. A wheel for a vehicle, the wheel comprising:

a core made of a first metal;

an outer shell made of a second metal;

wherein the core is configured as a casting; and a cast interface layer characterized by a cast grain structure and configured to metallurgically bond the core to the outer shell;

wherein the cast interface layer includes a cast intermetallic compound formed of the first metal of the core and the second metal of the outer shell.

8. The wheel of claim 7, wherein the first metal is a magnesium alloy; and wherein the second metal is an aluminum alloy.

9. The wheel of claim 7, wherein the casting defines a hub.

10. The wheel of claim 7, wherein the casting defines a hub bore.

11. The wheel of claim 7, wherein the casting includes a plurality of spoke openings.

12. The wheel of claim 11, wherein the plurality of spoke openings are further defined by the outer shell and by the interface layer.

13. The wheel of claim 7, further comprising:

the outer shell including an interface surface defined by the outer shell in contact with the core; and wherein the interface layer is coextensive with the interface surface.

14. The wheel of claim 7, wherein the outer shell is configured as one of a forging, a stamping, and an extrusion.

15. A wheel for a vehicle, the wheel comprising:

a core made of a first metal;

an outer shell made of a second metal and configured to substantially encapsulate the core; and wherein the outer shell is configured as a casting;

a cast interface layer characterized by a cast grain structure and configured to metallurgically bond the core to the outer shell;

wherein the cast interface layer includes a cast intermetallic compound formed of the first metal of the core and the second metal of the outer shell.

16. The wheel of claim 15, wherein the first metal is one of an aluminum alloy and a magnesium alloy; and wherein the second metal is the other of an aluminum alloy and a magnesium alloy.

17. The wheel of claim 15, wherein:

the core defines an interface surface in contact with the outer shell; and the interface layer is coextensive with the interface surface.

18. The wheel of claim 15, further comprising:

a wheel face defined by the outer shell and a first outer shell thickness; and a hub face defined by the outer shell and second outer shell thickness;

a bead portion defined by the outer shell and third outer shell thickness;

wherein the first outer shell thickness is greater than the second outer shell thickness; and wherein the third outer shell thickness is greater than the first outer shell thickness.

* * * * *